United States Patent [19]

Gafford et al.

[11] 4,382,528
[45] May 10, 1983

[54] PLANTER HOPPER WITH WEAR RING

[75] Inventors: Alexander T. Gafford, La Porte; Charles E. Adams, Mill Creek, both of Ind.

[73] Assignee: Allis-Chalmers Corporation, Milwaukee, Wis.

[21] Appl. No.: 291,457

[22] Filed: Aug. 10, 1981

[51] Int. Cl.³ .............................................. G01F 11/10
[52] U.S. Cl. ..................................... 222/367; 221/265
[58] Field of Search ...................... 221/196, 265, 266; 222/370, 367, 368, 369; 111/77, 74, 63

[56] References Cited

U.S. PATENT DOCUMENTS

| | | | |
|---|---|---|---|
| 254,444 | 2/1882 | Vogel et al. | 222/370 X |
| 307,457 | 11/1884 | Graze | 222/370 X |
| 719,237 | 1/1903 | Lindgren | 221/265 |
| 1,556,850 | 10/1925 | Kuhne | 222/369 X |

Primary Examiner—Joseph J. Rolla
Assistant Examiner—Kevin P. Shaver
Attorney, Agent, or Firm—Charles L. Schwab

[57] ABSTRACT

An agricultural planter having a seed singulating plate (28) rotatable about a vertical axis (30) to disperse seeds stored in a gravity flow hopper (12). A replaceable wear ring (38) of wear resistant material increases the useful life of the hopper and permits the renewal of a high wear surface without replacement of the hopper lower portion (14).

3 Claims, 4 Drawing Figures

PLANTER HOPPER WITH WEAR RING

BACKGROUND OF THE DISCLOSURE

This invention relates to agricultural planters, and more particularly, to the provision of a wear ring in the planter hopper of a plate-type planter. The planter in which the present invention is especially useful includes a seed compartment or hopper which has a lower portion in which a seed singulating plate is rotated about a vertical axis. It has been found that the peripheral surface of the hopper surrounding the seed plate wears excessively when planting certain seeds, such as soybeans, in a dusty environment. Accelerated wear is particularly noticeable when the hopper lids are removed and dust has easy access to the hopper interior.

BRIEF DESCRIPTION OF THE INVENTION

In order to obviate the excessive wear of the radially inward facing peripheral surface of the hopper confronting the cylindrical periphery of the seed singulating plate, an annular, replaceable band or ring of wear resistant material is placed in the interior of the hopper in confronting relation to the circumference of the seed singulating plate. The wear ring is preferably replaceable and secured in place by releasable fastening means which, when tightened, radially expand the ring.

BRIEF DESCRIPTION OF THE DRAWINGS

One embodiment of the present invention is illustrated in the drawings in which.

DETAILED DESCRIPTION OF THE DRAWINGS

Figure 1:
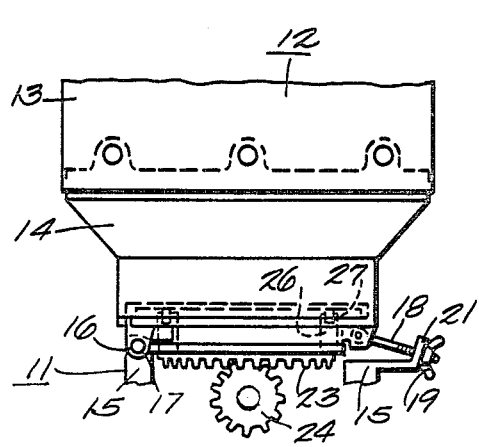
FIG. 1 is a partial side view of a planter with the hopper in its normal operating position.

Referring to FIG. 1, a gravity flow seed hopper 12 of an agricultural planter 11 includes an upper housing portion 13 riveted to a lower portion 14. The lower portion 14 is pivotally connected to a frame or support member 15 by a horizontal transverse pivot pin 16 for pivotal movement about a transverse horizontal axis 17 between the normal operating position shown in FIG. 1 and a pivoted position shown in FIG. 2 permitting emptying of the hopper and changing of seed plates. The pivotable hopper 12 is held in its operating position by an eye bolt 18 pivotally connected to the lower portion 14 and a cooperating wing nut 19, the latter engaging a pair of upwardly extending prongs 21, 22 on the frame member 15.

Figure 2:
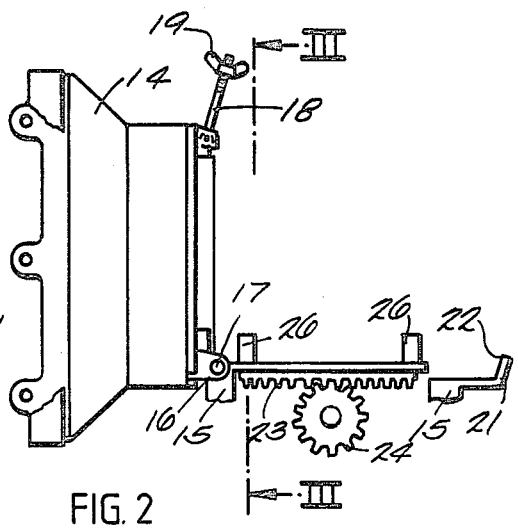
FIG. 2 is a side view similar to FIG. 1 but showing the hopper pivoted about a horizontal axis.
Figure 3:
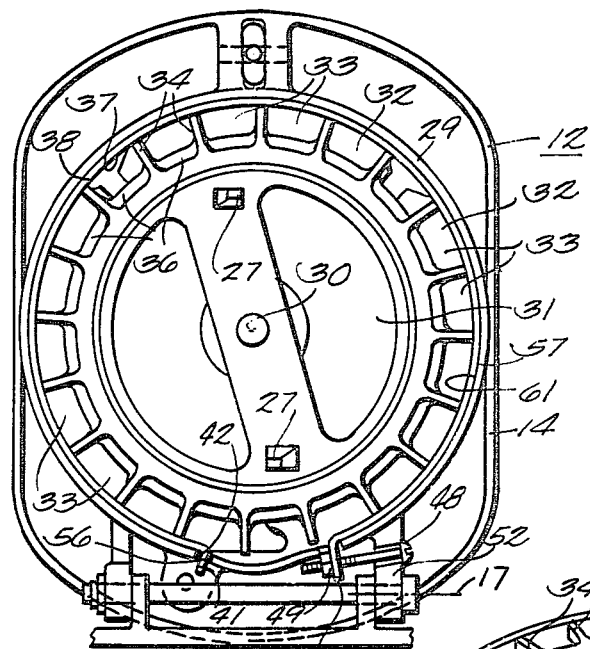
FIG. 3 is an enlarged view taken along the line III—III in FIG. 2.
Figure 4:
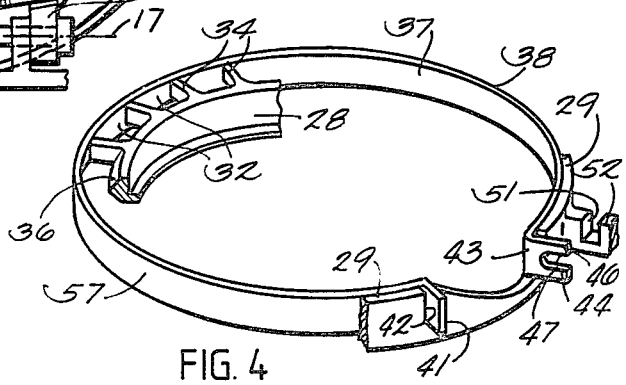
FIG. 4 is a perspective view showing the relationship between the seed singulating plate, the wear ring and the lower portion of the hopper.

Referring also to FIGS. 2 and 3, a ring gear 23 is driven by pinion 24 by a suitable power source, not shown, and upstanding lugs 26 on the ring gear engage downwardly extending lugs 27 of an annular seed singulating plate 28 disposed within a downwardly extending cylindrical wall 29 of the lower portion 14 of the hopper 12. Rotation of the plate 28 about its vertical axis 30 by the lugs 26, 27 effects singulation or seed dispersement of seed from the hopper. The downwardly extending annular flange or cylindrical wall 29 extends below a floor area 31 in the lower portion 14 which has circumferentially spaced openings 32 registering with seed receiving recesses 33 formed in the outer periphery of the seed singulating plate 28. The recesses 33 are defined by radially extending fingers 34, radially inner sloping surfaces 36 and a confronting vertical cylindrical surface 37 presented by a special circumferentially split wear ring 38.

Heretofore, when the hopper without a special wear ring was used, the inner cylindrical surface of the lower hopper wall 29 wore excessively when planting some crops such as soybeans. The wear accelerated when the cover was left off the hopper allowing dust and dirt to enter the hopper. Providing a replaceable ring 38 of a wear resistant material, such as steel, greatly extends the wear life of the cylindrical surface confronting the seed plate periphery. Also, the replaceability of the wear ring 38 permits inexpensive renewal of the cooperating wear surface 37 without the expense of replacing lower portion 14 of the hopper 12 which is normally a one piece cast part.

One circumferential end of the wear ring 38 is bent radially outward to present a radially outwardly extending flange 41 which fits in a vertically extending recess 42 in the cylindrical wall 29. The other circumferential end of the split wear ring 38 is bent radially outwardly to present a radially outward extending flange 43 which is notched to form a pair of vertically spaced fingers 44, 46 on opposite sides of a slot 47. Releasable fastening means in the form of a bolt 48 and nut 49 are used to releasably secure the wear ring 38 to the lower end of the hopper 12. The bolt 48 extends through the slot 47 in flange 43 and through a notch 51 in a pivot bracket 52 on the lower portion 14 of the hopper. When the nut 49 is tightened, the associated circumferential end or flange 43 of the wear ring 38 is urged in a circumferential direction away from the other circumferential end or flange 41 of the wear ring 38 tending to cause the wear ring to rotate about its axis 30 relative to the hopper lower portion 14. However, the flange 41 engages an abutment surface 56 defining in part the recess 42 preventing rotation of the wear ring 38. Since the wear ring cannot rotate, tightening of the releasable fastening means 48, 49 causes the ring to expand bringing its radially outer cylindrical surface 57 into abutment with the complementary radially outward facing cylindrical surface 61 on the vertical cylindrical wall 29. Thus, the releasable fastening means not only holds the ring in an assembled condition, but also expands the ring to eliminate looseness to insure proper clearance between the circumference of the seed singulating plate 28 and the wear ring 38.

When it is desired to replace the wear ring 38, the wing nut 19 is loosened to permit the hopper to be tilted about the axis 17. Next, the nut 49 is loosened to permit the relaxed ring 38 to be withdrawn axially from the cylindrical flange or wall 29. This invention permits the planter owner to renew the high wear surface of the hopper at a very low cost.

We claim:

1. A planter having a seed hopper with a cylindrical wall at its lower end confronting an annular seed singulating plate rotatable about a vertical axis characterized by
    an annular wear ring of wear resistant material removably positioned at the lower end of said seed hopper and disposed in radially confronting relation to the circumferential periphery of said seed singulating plate, said ring being circumferentially split and means releasably connecting one circumferential end of said ring to the lower end of said hopper limiting circumferential movement of said ring relative to said lower end.

2. The planter of claim 1 and further comprising releasable fastening means securing the other circumferential end of said ring to said lower end of said hopper.

3. The planter of claim 2 wherein said lower end of said hopper bottom includes an annular wall with an inward facing cylindrical surface in confronting relation to the radially outward facing surface of said ring and wherein said releasable fastening means is operable to move said other circumferential end of said ring in a circumferential direction away from said one end of said ring thereby radially expanding said ring urging said outward facing surface of the latter into engagement with said inward facing surface of said annular wall.

* * * * *